March 23, 1943.  S. S. ALLENDER  2,314,435
TREATMENT OF HYDROCARBONS
Filed Dec. 18, 1939
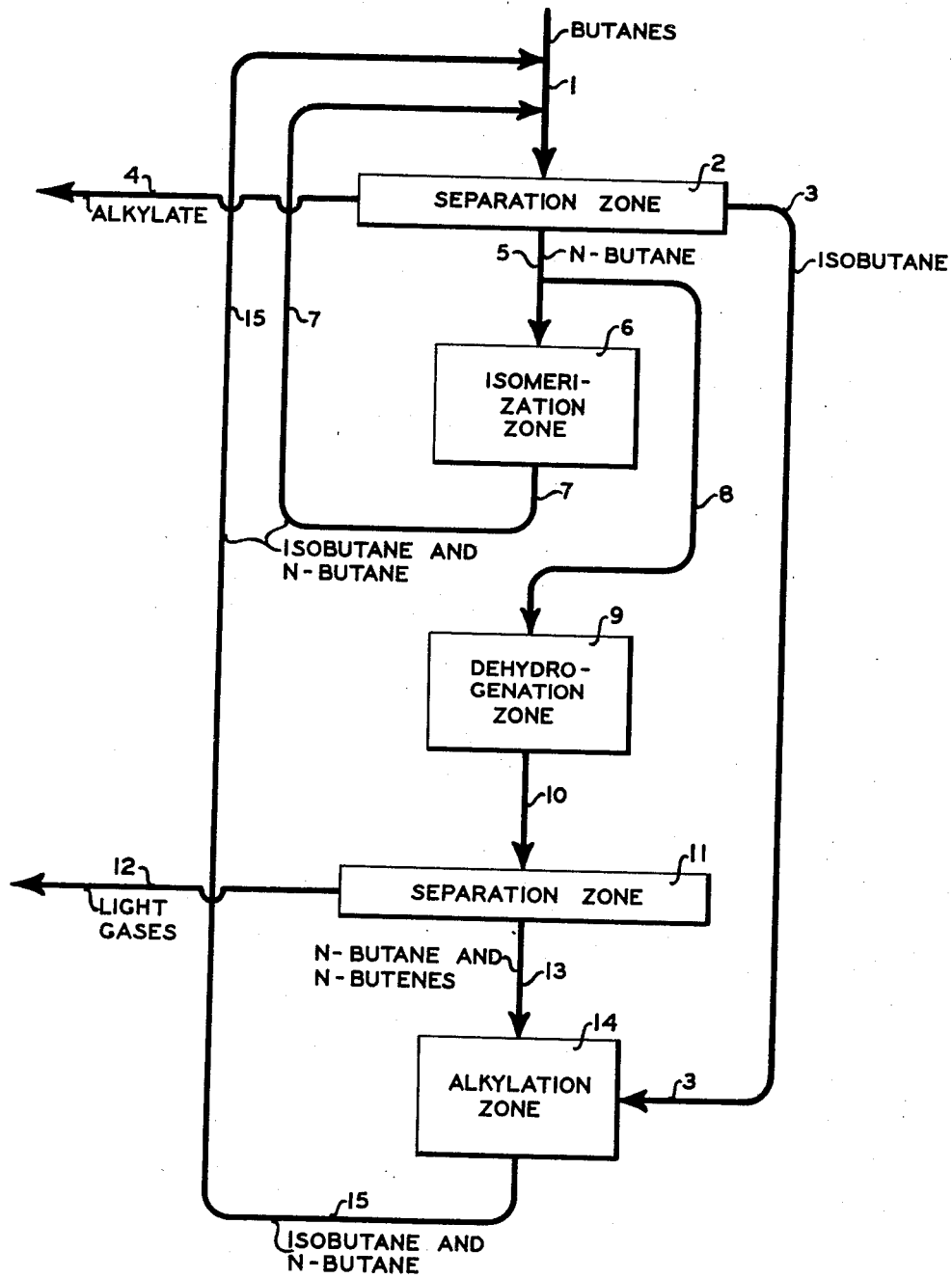
INVENTOR
SAMUEL S. ALLENDER
BY Lee Gary
ATTORNEY Patented Mar. 23, 1943

2,314,435

UNITED STATES PATENT OFFICE 2,314,435

TREATMENT OF HYDROCARBONS

Samuel S. Allender, New York, N. Y., assignor to Universal Oil Products Company, Chicago, Ill., a corporation of Delaware Application December 18, 1939, Serial No. 309,756

2 Claims. (Cl. 196—10)

This invention relates to the treatment of butanes, and in a more specific sense it is concerned with a process for converting butanes into gasoline of high anti-knock value.

Butanes, both iso and normal, occur in large quantities in natural gas, particularly in those gases associated with the production of crude oil and commonly known as casing head gases. This supply of butanes is further augmented by those present in gases produced in the cracking of oils for the production of gasoline, although this latter type of pyrolytically produced gas contains substantial quantities of olefins as well as paraffins. The greater part of the butane production is used for blending with gasoline to produce the desired vapor pressure. Since the amount of butane required for this purpose is less in summer than in winter there are frequent periods of over-production of these gaseous hydrocarbons during which they are utilized largely for domestic and industrial fuel purposes.

In one specific embodiment the present invention comprises a process for producing gasoline from a mixture of isobutane and normal butane comprising fractional distillation of the butanes, subjection of a portion of the normal butane to isomerization to produce substantial yields of isobutane, dehydrogenation of the remainder of the normal butane to form butenes, alkylation of the total isobutane obtained from the charge and isomerization products by normal butenes derived from the dehydrogenation step to produce a mixture of alkylation products in unconverted butanes, and return of said mixture to the original butane fractional distillation zone in which are separated isobutane, normal butane, and a substantially saturated alkylate.

Isomerization of normal butane may be effected by contacting normal butane in the presence of hydrogen chloride with a granular composite comprising substantially anhydrous aluminum chloride or a mixture of substantially anhydrous chlorides of aluminum and copper preferably supported by a granular carrier such as activated carbon, pumice, various types of fuller's earth and clays, particularly those of the montmorillonite and bentonite types either raw or acid treated, diatomaceous earth, a silica-alumina composite, unglazed porcelain, firebrick, and in general, refractory porous substances which have substantially no chemical reactivity with aluminum chloride and/or copper chloride. In the presence of such composite catalysts normal butane may be converted into approximately 30-60% isobutane per pass when utilizing a temperature in the approximate range of 200-650 F., and preferably under a pressure of hydrogen in the range of substantially atmospheric to approximately 3000 pounds per square inch and preferably in the range of 150-3000 pounds per square inch. While inert gases, such as nitrogen, may sometimes be employed alternatively in producing the necessary pressure, experiments have shown that hydrogen is preferable, as its presence seems to minimize undesirable side reactions involving decomposition rather than the desired isomerization.

There are several alternative catalysts comprising aluminum chloride or mixtures of chlorides of aluminum and copper supported on inert carrying materials which may be employed to effect the isomerization step of the present invention. While many of these carrying materials may be used more or less interchangeably, some are more effective than others and it is not intended to infer that all carriers are definitely equivalent. Also, it frequently happens that one type of carrier or support is better for use with a given catalyst containing metal chlorides, depending upon the ratio of metal chlorides to support found experimentally to be best for the furtherance of the butane isomerizing reaction. Accordingly, it is not to be inferred that the supports can at all times be used interchangeably. Extensive experiments have indicated that best results are obtained when a minor percentage of hydrogen chloride is present in the reaction and this necessary amount of hydrogen chloride may be introduced directly or produced in situ by using amounts of water or steam which cause a certain amount of hydrolysis of the metallic chloride catalyst.

Catalysts which may be utilized for the dehydrogenation of normal butane to normal butenes comprise refractory spacing agents or carriers selected from the group consisting of activated alumina, magnesia, silica, and diatomaceous earth; and minor amounts of the oxides of elements selected from members of the left-hand columns of groups 4, 5, and 6 of the periodic table consisting of titanium, zirconium, cerium, hafnium, and thorium; vanadium, columbium, and tantalum· chromium, molybdenum, tungsten, and uranium.

Such dehydrogenation catalysts are normally utilized at a temperature in the approximate range of 750-1200° F., at atmospheric pressure or under a superatmospheric pressure of up to approximately 100 pounds per square inch and with an hourly charging rate of gas measured under normal conditions of temperature and pressure of approximately 200–4000 times the volume of the portion of the reactor containing the catalyst layer. Such a charging rate is commonly referred to as a gaseous space velocity in the approximate range of 200–4000. Under these conditions approximately 25–30% dehydrogenation occurs per pass at a contact time in the approximate range of 0.1–2.5 seconds, although the contact time may occasionally be as high as approximately 20 seconds. The time of contact employed will vary greatly with the catalyst used, the temperature of operation employed, and other factors. Since a desirable method of operating commercial plants is to utilize dehydrogenation units connected in parallel so that one may be processing a hydrocarbon charge while the other is being reactivated, it is preferable to so balance conditions in the two halves of the cycle that the times of processing and reactivation are substantially equal.

A further problem to be solved by trial is the question of the length of the operating cycle, since higher overall results are obtained in continuous plants when operations are conducted for a relatively short interval followed by a corresponding short time of reactivation rather than when the catalyst particles are permitted to become contaminated excessively by carbonaceous deposits.

Alkylation catalysts useful for effecting reactions between butenes and isobutane according to the process of this invention, comprise sulfuric acid, phosphoric acid, hydrogen fluoride, aluminum chloride with hydrogen chloride, and a precalcined composite of an acid of phosphorus and a siliceous adsorbent.

For production of high yields of gasoline without substantial decomposition of the alkylation products through so-called destructive alkylation reactions, when employing sulfuric acid, hydrogen fluoride, or aluminum chloride with hydrogen chloride as catalysts, the process is preferably carried out at a temperature below approximately 210° F., and under sufficient pressure that substantial proportions of the butanes are present as liquids. While the exact operating temperature for alkylation is dependent upon the composition of the mixture being treated, the lower temperatures at which alkylation proceeds at a practical rate are approximately —50° F. when using substantially anhydrous aluminum chloride with hydrogen chloride as the catalyst mixture, at —60° F. with approximately 90–100% hydrogen fluoride as catalyst, and at —15° F. when effecting alkylation in the presence of sulfuric acid which when highly concentrated solidifies at low temperatures.

When phosphoric acid is employed as catalyst it is conveniently used in the form of a solid composite or granular precalcined mixture with a generally siliceous adsorbent, such as diatomaceous earth. In the presence of such granular material, the preparation of which is described in United States Patent No. 1,993,513 and others, isobutane is alkylated by butenes at a temperature in the approximate range of 600–900° F. under a pressure of the order of 1000–3000 pounds per square inch and a high quality motor fuel is produced.

The use of a combination of butane isomerization, dehydrogenation, and alkylation according to the process of this invention has the advantage that saturated gasoline of high octane number may be produced without the necessity of hydrogenation which is inherent in the formation of gasoline, which may be used for aviation purposes, by the more common processes involving dehydrogenation of butane, polymerization of the resultant olefins to iso-octenes, and hydrogenation of the iso-octenes to iso-octanes. The preferred practice of fractionally distilling the butanes before dehydrogenating reduces the size of equipment needed for and the operating cost of the dehydrogenation step, since isobutane present in the charge is not dehydrogenated but utilized in entirety, together with that formed by isomerization of normal butane, in the alkylation by butenes resulting from the dehydrogenation of normal butane.

Normal butane made available by the fractional distillation of the butanes charged may be isomerized efficiently to give approximately a 30–60% yield of iso-butane which may be admixed with the isobutane fractionated from the original charging stock so as to provide an ample proportion of this isoparaffin for use in producing alkylation product utilizing butenes produced by the dehydrogenation of another portion of the normal butane content of the same mixed butane charging stock.

After such alkylation treatment the total product consisting of substantially saturated alkylate and unconverted butanes may be returned to the original butane separating zone in which isobutane is separated from the normal butane in the presence of the alkylate used as reflux liquid. Isobutane so separated is conducted to the alkylation step while normal butane separated by stabilizing the alkylate used as a reflux is conducted to further isomerization and dehydrogenation.

For the purpose of illustrating the combination of steps characteristic of the present invention, the attached drawing shows diagrammatically a typical process flow for producing gasoline of high octane number from a 4-carbon atom hydrocarbon fraction comprising essentially isobutane and normal butane.

Referring to the drawing a 4-carbon atom hydrocarbon fraction comprising essentially isobutane and normal butane is introduced through line 1 to separation zone 2 which may comprise a suitable fractional distillation column using adequate reflux consisting of a portion of the charged hydrocarbons together with alkylation products formed as herein subsequently described. By utilizing such a reflux material the temperatures within the fractional distillation column may be controlled so that isobutane may be separated in a relatively high degree of purity, and discharged through line 3 for use as hereinafter described. Separation zone 2 may also comprise suitable stabilizing equipment in which normal butane may be separated from the alkylate fraction which is withdrawn through line 4.

Normal butane withdrawn from separation zone 2 through line 5 is conducted in part to isomerization zone 6 while the remainder of the normal butane is passed from line 5 through line 8 to dehydrogenation in dehydrogenation zone 9 to be described subsequently.

Isomerization zone 6 may consist of a suitable reactor or group of reactors containing a granular composite of aluminum chloride or a mixture of chlorides of aluminum and copper deposited upon or within a substantially inert carrier or support. Isomerization zone 6 is provided with adequate means for maintaining the temperature required for efficient conversion of normal butane into isobutane in the presence of such supported metal chloride catalysts preferably in the presence of hydrogen chloride. The product withdrawn from isomerization zone 6 through line 7 to line 1 already mentioned and thence to separation zone 2 consists essentially of a mixture of isobutane and normal butane from which isobutane is removed and conducted to alkylation while unconverted normal butane is subjected to further isomerization and to dehydrogenation as hereinafter described.

The portion of normal butane conducted from line 5 through line 8 to dehydrogenation as hereinabove indicated is contacted with a dehydrogenation catalyst in dehydrogenation zone 9 which may comprise a tube or chamber or a plurality of such reactors. The dehydrogenation catalyst employed may comprise essentially a composite of a major proportion of an inert carrier and a relatively minor proportion of an oxide of an element selected from the members of the left-hand columns of groups 4, 5, and 6 of the periodic table. One of these preferred catalysts consists of chromium sesquioxide and activated alumina. Dehydrogenation zone 9 may also comprise a preheating section in which normal butane is brought to a dehydrogenation temperature before being admitted to the reactors containing the granular dehydrogenation catalyst. From dehydrogenation zone 9 a mixture of unconverted normal butane with approximately 20–25 mole per cent of normal butenes together with hydrogen, and 3-carbon atom and lighter gases, is withdrawn through line 10 to separation zone 11 which may comprise suitable absorbing and stripping equipment by which 3-carbon atom hydrocarbons and lighter gases may be eliminated through line 12 while the resulting mixture of butenes and butane may be conducted from separation zone 11 through line 13 to alkylation zone 14 in which is formed a substantially saturated alkylate which is withdrawn through line 15 together with unconverted butanes and is recycled by way of line 1 to separation zone 2 already described.

The total of isobutane originally present in the butanes charged to the process and the isobutane resulting from isomerization of normal butane is conducted from separation zone 2 through line 3 already described to alkylation zone 14 which may consist of a suitable reactor provided with adequate means for agitating and cooling or heating to maintain the temperature required for the reaction in the presence of a chosen alkylation catalyst. In case a granular phosphoric acid-containing composite is employed as catalyst the alkylation reactor may be a cylindrical chamber containing the catalyst and designed to operate under the necessary conditions of temperature and pressure. The exact conditions of temperature and pressure employd in any given alkylation reaction will be determined by the catalyst, the composition of the reaction mixture, and by other factors.

Since the total alkylation product has been found to consist of approximately 90% aviation gasoline and 10% of higher boiling materials, it is possible to produce substantially these yields of products from the butane mixture available as charging stock. This desirable result is achieved by properly proportioning the amount of normal butane conducted to dehydrogenation and to isomerization so that sufficient butenes and isobutane are formed in these respective zones that they may later undergo substantially complete interaction in the alkylation zone.

The following example is introduced to show results normally obtainable in the operation of the process, although the data are not presented with the intention of unduly limiting the broad scope of the invention:

EXAMPLE

A butane fraction containing 30 mole per cent of isobutane and 70 mole per cent of normal butane was fractionally distilled in the presence of alkylation product used as reflux to separate substantially the individual butanes. Part of the normal butane so separated was contacted in the presence of 4% by volume of hydrogen chloride at 500° F. under a hydrogen pressure of 650 pounds per square inch with a granular material comprising essentially 35% by weight of anhydrous aluminum chloride and 65% by weight of crushed firebrick. This isomerization treatment produced a mixture containing 3% propane, 33% isobutane, 61% normal butane, and 3% pentanes.

Another portion of the normal butane was contacted with a composite of 8% by weight of chromium sesquioxide on alumina at 1112° F. under atmospheric pressure with a gaseous space velocity of 1500. Under these conditions 25% dehydrogenation of normal butane to normal butenes occurred per pass. In addition to hydrogen, relatively small amounts of 3-carbon atom and lighter hydrocarbons were admixed with the butane and butenes.

The isobutane separated from the original butane fraction by distillation in the presence of the alkylation product together with isobutane formed from normal butane by isomerization was commingled with the mixture of normal butane and normal butenes resulting from the dehydrogenation of normal butane. The resultant commingled mixture was then conducted to alkylation in the presence of sulfuric acid of 97% concentration at 45° F. under a pressure of 150 pounds per square inch. Under these conditions reaction occurred between isobutane and normal butenes producing a normally liquid paraffinic product containing 90% by volume of aviation gasoline with 300° F. end point and 92 octane number.

Upon the basis of 1000 molecular proportions of butane fraction charged, a number of 4-carbon atom hydrocarbon streams present at different points in the process flow had the composition indicated in the following table.

TABLE

Composition of 4-carbon atom hydrocarbon streams, molecular proportions

|  | Isobutane | n-Butane | Butenes | Alkylate |
|---|---|---|---|---|
| Butanes charged | 300 | 700 |  |  |
| To dehydrogenation, including recycle |  | { 526<br>2104 } |  |  |
| To isomerization, including recycle |  | { 174<br>522 } |  |  |
| Dehydrogenation products |  | 1630 | 474 |  |
| Total to alkylation | 2844 | 1630 | 474 |  |
| From alkylation | 2370 | 1630 |  | 474 |

Alkylation converted the 474 molecular proportions of butenes and 474 molecular proportions of isobutane into a substantially saturated alkylate. On a volume basis, 314 barrels of butane fraction yielded 209 barrels of a substantially saturated alkylate containing 90% by volume of 300° F. end point gasoline of 92 octane number.

The character of the present invention and its novelty and utility in producing gasoline from butane can be seen from the preceding specification and numerical data presented, although neither section is intended to limit unduly its generally broad scope.

I claim as my invention:

1. A process for producing gasoline from a butane fraction containing isobutane and normal butane which comprises fractionally distilling said butane fraction to separate isobutane and normal butane; subjecting a portion of said normal butane to isomerization to form a mixture comprising essentially isobutane and normal butane; returning said mixture to the butane fractional distillation to separate isobutane and normal butane; dehydrogenating the remainder of the normal butane to produce a dehydrogenation product consisting of normal butane, butenes, 3-carbon atom hydrocarbons, and lighter gases; separating said dehydrogenation product into a butane-butene fraction and a mixture of 3-carbon atom hydrocarbons and lighter gases; subjecting the total isobutane obtained from the original butane mixture and from the isomerization to alkylation with normal butenes contained in said butane-butene fraction to produce a mixture of alkylation products and unconverted butanes; and returning said mixture to the original butane fractional distillation to separate isobutane, normal butane, and a substantially saturated alkylate and to furnish a refluxing medium for the fractional distillation of said butane fraction.

2. A process for producing more valuable products from a hydrocarbon mixture containing isobutane and normal butane, which comprises fractionating the mixture to separate isobutane from normal butane, subjecting a portion of the separated normal butane to isomerization to form additional isobutane and returning the resultant products to the fractionating step for separation of the additional isobutane together with the first-mentioned isobutane, subjecting the remainder of the separated normal butane to dehydrogenation to produce butene therefrom, the amount of said remainder and the dehydrogenation thereof being controlled to produce a quantity of butene that will be substantially completely reacted under alkylating conditions with the isobutane separated in the fractionating step, combining the butene from the dehydrogenating step with the isobutane from the fractionating step, subjecting the resultant mixture to alkylation to react the butene with isobutane, supplying resultant alkylation products to the fractionating step for stabilization therein and to serve as a refluxing medium in the separation of isobutane from normal butane, and withdrawing a liquid alkylate from the fractionating step.

SAMUEL S. ALLENDER.